(12) United States Patent
Young et al.

(10) Patent No.: US 7,979,359 B1
(45) Date of Patent: Jul. 12, 2011

(54) SYSTEM AND METHOD FOR SELECTIVELY APPLYING AN ITEM SORTATION PROCESS

(75) Inventors: Eric Young, Mercer Island, WA (US); Arthur Valdez, Flower Mound, TX (US); Hong Tian, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 195 days.

(21) Appl. No.: 12/139,839

(22) Filed: Jun. 16, 2008

(51) Int. Cl.
*G06Q 10/00* (2006.01)
*G06Q 30/00* (2006.01)

(52) U.S. Cl. ............................. 705/332; 705/1.1; 705/28
(58) Field of Classification Search .................. 705/1.1, 705/27, 28, 332
See application file for complete search history.

(56) References Cited

U.S. PATENT DOCUMENTS

| | | | |
|---|---|---|---|
| 5,613,591 A | 3/1997 | Heit et al. | |
| 5,794,789 A | 8/1998 | Payson et al. | |
| 6,478,144 B1 | 11/2002 | Sweazy | |
| 7,136,830 B1 * | 11/2006 | Kuelbs et al. | 705/27 |
| 7,426,484 B2 * | 9/2008 | Joyce et al. | 705/28 |
| 7,584,113 B2 * | 9/2009 | Denton et al. | 705/8 |
| 2002/0178074 A1 * | 11/2002 | Bloom | 705/26 |
| 2002/0178077 A1 * | 11/2002 | Katz et al. | 705/26 |
| 2006/0080133 A1 * | 4/2006 | Das et al. | 705/1 |
| 2006/0136237 A1 * | 6/2006 | Spiegel et al. | 705/1 |
| 2006/0278501 A1 | 12/2006 | Sweazy | |
| 2007/0150383 A1 * | 6/2007 | Shakes et al. | 705/29 |
| 2007/0156498 A1 * | 7/2007 | Zwerger et al. | 705/9 |
| 2007/0162360 A1 * | 7/2007 | Congram et al. | 705/28 |
| 2007/0283590 A1 * | 12/2007 | White et al. | 33/763 |
| 2008/0015884 A1 * | 1/2008 | Jamula | 705/1 |

FOREIGN PATENT DOCUMENTS

JP 06080219 A * 3/1994

* cited by examiner

*Primary Examiner* — Fadey S Jabr
(74) *Attorney, Agent, or Firm* — Robert C. Kowert; Meyertons, Hood, Kivlin, Kowert & Goetzel, P.C.

(57) ABSTRACT

Various embodiments may include a shipping consolidation analyzer configured to determine whether a sortation process is to be applied to at least a subset of an item group at a facility. Such item group may include multiple items to be shipped to a common destination. Each item of the item group may be associated with a default non-sortable status. Such sortation process may include a process for indicating at least two items of the subset as consolidated for shipment. The shipping consolidation analyzer may, in response to determining that the sortation process is to be applied to the subset, generate an instruction such that the sortation process is applied at the materials handling facility to the subset of the item group.

45 Claims, 8 Drawing Sheets

| order identifier 600 ||
|---|---|
| item identifier 620a | item quantity 630a |
| item identifier 620b | item quantity 630b |
| item identifier 620c | item quantity 630c |
| item identifier 620d | item quantity 630d |
| item identifier 620e | item quantity 630e |
| item identifier 620f | item qu antity 630f |
| item identifier 620g | item quantity 630g |
| item identifier 620h | item quantity 630h |
| item identifier 620i | item quantity 630i |
| item identifier 620j | item quantity 630j |
| item identifier 620k | item quantity 630k |
| item identifier 620l | item quantity 630 l |
| item identifier 620m | item quantity 630m |
| item identifier 620n | item quantity 630n |
| item identifier 620o | item quantity 630o |

FIG. 6A

| order identifier 600 |  |
|---|---|
| apply sorting process 615 | |
| item identifier 620a | item quantity 630a |
| item identifier 620b | item quantity 630b |
| item identifier 620f | item quantity 630f |
| item identifier 620g | item quantity 630g |
| item identifier 620i | item quantity 630i |
| item identifier 620j | item quantity 630j |

*FIG. 6B*

| order identifier 600 | |
|---|---|
| do not apply sorting process 625 | |
| item identifier 620c | item quantity 630c |
| item identifier 620d | item quantity 630d |
| item identifier 620e | item quantity 630e |
| item identifier 620h | item quantity 630h |
| item identifier 620k | item quantity 630k |
| item identifier 620l | item quantity 630l |
| item identifier 620m | item quantity 630m |
| item identifier 620n | item quantity 630n |
| item identifier 620o | item quantity 630o |

*FIG. 6C*

SYSTEM AND METHOD FOR SELECTIVELY APPLYING AN ITEM SORTATION PROCESS

BACKGROUND

Many companies package groups of items together for a variety of purposes, such as e-commerce and mail order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by clients or customers. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

However, shipments that include one or more unusually large items (e.g., large with respect to one or more item dimensions and/or item weight) can be difficult for a materials handling facility to process. They are often treated as exceptions because the infrastructure of the materials handling facility may not be designed to elegantly handle such items. To remedy this problem, some companies establish alternate materials handling facilities dedicated to preparing shipments of unusually large items. The infrastructure of such alternate materials handling facilities may be more suited to prepare shipments of unusually large items. A more traditional materials handling facility might rely heavily on automated or mechanized infrastructure that requires items to have certain characteristics (e.g., dimensional or weight restrictions). For example, such materials handling facilities might enforce dimensional constraints on items to ensure that the items will properly fit on a conveyance system (e.g., a cart or conveyor belt) within the facility. In contrast, an alternate materials handling facility might rely more heavily on manual or man-powered operations that require less stringent constraints on items within the facility.

In many cases, such alternate materials handling facilities are dedicated to fulfilling orders for one or more items in a non-sortable fashion. For instance, a given multiple-item order may be split up into single items for purposes of packaging and shipping. Typically, such a materials handling facility arrangement is chosen to increase simplicity and efficiency. For instance, by packaging and shipping orders as single item shipments, the burden of sorting multiple items into the same shipment (whether by automated or manual techniques) is removed from the facility.

BRIEF DESCRIPTION OF THE DRAWINGS

FIGS. 6A-6C illustrate an example of items of an item group that are consolidated into multiple shipment sets in accordance with the method described herein, according to some embodiments.

Figure 1:
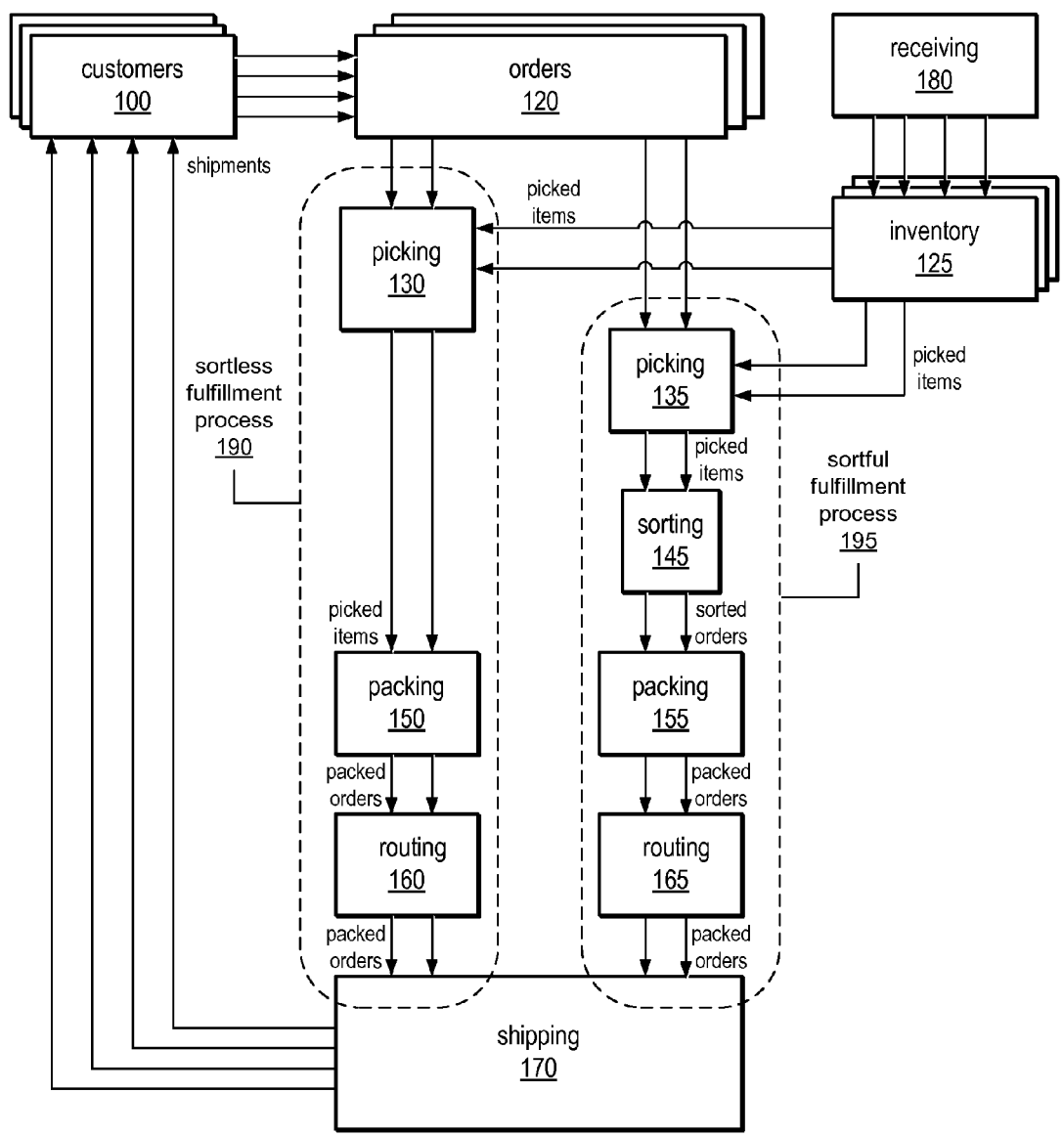
FIG. 1 illustrates a block diagram of the operations performed within a materials handling facility, according to some embodiments.

While the system and method for selectively applying an item sortation process is described herein by way of example for several embodiments and illustrative drawings, those skilled in the art will recognize that the system and method for selectively applying an item sortation process is not limited to the embodiments or drawings described. It should be understood, that the drawings and detailed description thereto are not intended to limit the system and method for selectively applying an item sortation process to the particular form disclosed, but on the contrary, the intention is to cover all modifications, equivalents and alternatives falling within the spirit and scope of the system and method for selectively applying an item sortation process as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for selectively applying an item sortation process are described. The system and method for selectively applying an item sortation process may include a shipping consolidation analyzer, which may in various embodiments be implemented as a component of a packing information system. A packaging information system may include various components used to facilitate efficient and/or cost-effective operations in a materials handling facility. For example, in some embodiments, a packaging information system may include a shipping consolidation analyzer configured to facilitate packing and shipping operations by determining if and how a given group of items should be consolidated into one or more shipments. The shipping consolidation analyzer described herein may be implemented in one or more software modules executing on one or more nodes of a computing system (e.g., as program instructions and data structures configured to implement functionality described), or in any combination of hardware and software components suitable for implementing the functionality described. For example, the shipping consolidation analyzer may in some embodiments be implemented as program instructions encoded on a computer-readable storage medium for execution by a computing system. For illustrative purposes, some embodiments of a shipping consolidation analyzer are described below in which particular item and container parameters are analyzed in particular manners, and in which particular types of analyses and processing of parameters are performed. However, those skilled in the art will appreciate that the techniques described may be used in a wide variety of other situations, and that embodiments of these techniques are not limited to the details of these examples.

An exemplary block diagram of a materials handling facility, which in one embodiment may be an order fulfillment facility configured to utilize a shipping consolidation analyzer, is illustrated in FIG. 1. In this example, multiple customers 100 may submit orders 120 to a distributor, where each order 120 specifies one or more items from inventory 125 to be shipped to the customer or to another entity specified in the order. An order fulfillment facility typically includes a receiving operation 180 for receiving shipments of stock from various vendors and storing the received stock in inventory 125. The items of customer orders 120 may in some embodiments be fulfilled according to sortless fulfillment process 190 or sortful fulfillment process 195. For a given order (or item group as described in more detail below), the shipping consolidation analyzer described herein may in various embodiments selectively determine whether to fulfill items of the order according to sortless fulfillment process 190 or sortful fulfillment process 195.

Sortless Fulfillment Process

To fulfill the customer orders 120 according to sortless fulfillment process 190, the one or more items specified in each order may be retrieved or "picked" from inventory 125 (which may also be referred to as stock storage) in the order fulfillment facility, as indicated by block 130. In the sortless fulfillment process 190, items of an order are not consolidated for shipment and instead are shipped as single items (e.g., one item per shipping container). However, while in the materials handling facility, items handled via the sortless fulfillment process 190 may be grouped for a variety of reasons prior to packing. For instance, picking 130 may include picking items from inventory 125 in a batched manner. For example, picking 130 might include picking a batch of multiple items that may be from the same order, different orders, or some combination thereof. Picked items may be delivered to one or more stations in the order fulfillment facility for packing 150. Packing 150 may include packing each picked item into a separate box in preparation for shipment. By packing each picked item into a separate shipping container, the sortless fulfillment process may circumvent the need to sort items and thereby conserves resources (e.g., labor and/or machinery). As illustrated by routing 160, packed orders may be routed via various paths to various shipping stations, as illustrated by shipping 170. Shipping 170 may in various embodiments include providing the packed shipments that each contain a single item of the order to one or more shipping carriers for shipment to customers 100.

As described above, by packing each picked item into a separate shipping container, the sortless fulfillment process may circumvent the need to sort items and thereby conserves resources (e.g., labor and/or machinery). However, in some cases, utilizing sortless fulfillment process 190 may result in poor shipping container utilization. For instance, in an example scenario in which a customer orders 25 widgets, the fulfillment of such order according to the sortless fulfillment process 190 may result in 25 different shipments (e.g., 25 boxes, each containing one widget). As can be readily seen from this example, such a shipping arrangement may result in a poor customer experience since the customer may be required to unpack 25 different boxes. Additionally, such a shipping arrangement may in some cases provide poor volumetric utilization of shipping containers since multiple items are not consolidated into the same shipping container.

Sortful Fulfillment Process

To fulfill the customer orders 120 according to sortful fulfillment process 195, the one or more items specified in each order may be retrieved or "picked" from inventory 125 in the order fulfillment facility, as indicated by block 135. In the sortless fulfillment process 190, multiple items of an order may be consolidated into one or more shipping containers. While in the materials handling facility, items handled via the sortful fulfillment process 195 may be grouped for a variety of reasons prior to packing. For instance, picking 135 may include picking items from inventory 125 in a batched manner. For example, picking 130 might include picking a batch of multiple items that may be from the same order, different orders, or some combination thereof. Picked items may be delivered to one or more stations in the order fulfillment facility for sorting 145. Sorting 145 may include sorting the picked items into respective shipments. Each shipment may include one or more items to be consolidated into the same shipping container during packing 155. With respect to an order containing multiple items, the sortful fulfillment process may in some cases require more facility resources (e.g., labor and/or machinery) than the sortless fulfillment process due to the amount of resources necessary to sort and pack items into shipments having multiple items. As illustrated by routing 165, packed orders may be routed via various paths to various shipping stations, as illustrated by shipping 170. Shipping 170 may in various embodiments include providing the packed shipments to one or more shipping carriers for shipment to customers 100.

As described above, by consolidating multiple items into one or more shipping containers for shipment, the sortful fulfillment process may require more facility resources (e.g., labor and/or machinery) than the sortless fulfillment process (e.g., for a given order of multiple items). However, in some cases, utilizing sortful fulfillment process 190 may result in more efficient shipping container utilization. For instance, in an example scenario in which a customer orders 25 widgets, the fulfillment of such order according to the sortful fulfillment process 195 may result in a single shipment (e.g., one box containing 25 widgets). As described in more detail below, other manners of consolidating such an order are possible and contemplated (e.g., five shipment containers each containing five widgets). As can be readily seen from this example, such a shipping arrangement may result in a more positive customer experience since the customer is not required to unpack 25 different boxes (as is the case in the example described above with respect to the sortless fulfillment process). Additionally, such a shipping arrangement may in many cases provide more efficient volumetric utilization of shipping containers since multiple items may be consolidated into the same shipping container. For example, instead of two shipping containers having 50% volumetric utilization, the sortful fulfillment process may instead result in a single shipping container having 100% volumetric utilization.

Note that portions of an order may be received at different times, so sorting 145, packing 150, and packing 160 may have to wait for one or more items for some orders or shipment sets to be delivered to the sorting station(s) before completion of processing of the orders. As noted above, a picked, packed and shipped order does not necessarily include all of the items ordered by the customer; a shipped order may include only a subset of the ordered items available to ship at one time from one inventory-storing location. Also note that the various operations of an order fulfillment facility may be located in one building or facility, or alternatively may be spread or subdivided across two or more buildings or facilities. In various embodiments, items and groups of items may be transported between the stations or operations of the facility in one or more containers, through one or more portals, and/or using one or more dimensionally-constrained paths, as described herein.

In some embodiments, information about the containers used in handling one or more items during the operations described above may be automatically captured as a by-product of normal operation. For example, the packaging information system may receive or capture an identifier of a shipping container (e.g., a box) when an agent places an item in the container, according to various embodiments. Similarly, the packaging information system may automatically receive or capture an identifier of an item when it is placed in the container, in some embodiments. For example, a bar code or Radio Frequency Identification tag (RFID tag) of a container and/or an item may be scanned automatically as part of normal operations when items are placed in a container for shipping, and the data from the scanner may be automatically stored in one or more tables, databases, or other data structures accessible by the packaging information system. Therefore, in some embodiments, no additional steps may need to be performed to capture identifiers of the items and the containers in which they are placed. In some embodiments, these identifiers may be associated with one or more entries in tables, databases, or other data structures containing dimension and/or weight values currently associated with various containers and items.

A packaging information system may in some embodiments include a container recommender configured to instruct or recommend the selection, from among available containers, of a container in which to place one or more items, or a portal or path through which to convey the items, during the receiving 180, storing in inventory 125, picking 130 or 135, sorting 145, packing 150 or 155, or shipping 170 operations described above. For example, the system may be configured to recommend various boxes or other containers suitable for shipping one or more items or for storing or conveying one or more items in the materials handling facility, dependent on item dimension values and/or weight values currently associated with the items. In one embodiment, the system may recommend a particular box type and/or size suitable for shipping a group of items associated with a customer order based on item dimension values and/or weights provided by the vendor of each of the items in the group and the dimensions and weight limitations of the boxes available for shipping. In other embodiments, the system may recommend a particular box type and/or size suitable for shipping a group of items dependent on item dimension values and/or weights measured in the facility or learned by the packaging information system through an automated process of successive approximation. In some embodiments, the selection of containers that are neither too small nor larger than they need to be may result in more efficient use of space in the facility for storage and other operations, and may also reduce costs associated with floor space, packing materials, or transportation (e.g., shipping). In some embodiments, the box recommender may be used to estimate corresponding dimensions of a container suitable for storing, transporting, or shipping the items that is space-efficient and/or cost effective. Note that costs associated with the selection of an inappropriate container for a group of items may include labor costs associated with rework, if they must be removed from one container and placed in one or more other containers.

Note that, as used herein, "item groups" may refer to items grouped for shipping to a customer or items grouped for any other operation within a materials handling facility, such as for storing in inventory or transporting to a packing or shipping station. In various embodiments, "containers" may include pallets, crates, cases, bins, boxes, carts, totes, conveyor belts, shelves, cabinets, or any other apparatus capable of storing, conveying or shipping one or more items.

In some embodiments, a packaging information system may include a shipping consolidation analyzer. For example, a shipping consolidation analyzer may be used as part of a distribution operation for an organization that ships large numbers of item groups to customers. In some embodiments, the organization may maintain information about each of the items that is available to be shipped. If the system has sufficient information about the items intended to be the contents of an item group (e.g., if item dimension information and/or weight information is currently associated with the items in the item group), the shipping consolidation analyzer may be configured to, for a given item group to be shipped to the same destination, determine various combinations of possible shipping configurations. Each shipping configuration may specify a different configuration for packing one or more items in one or more shipping containers. For example, for an order of three items, the shipping consolidation analyzer may determine that all of the items may be shipped in the same shipping container, each of the items may be shipped in separate containers, or that two of the items may be shipped in the same shipping container while the third is shipped separately in its own shipping container. For each shipping configuration, the shipping consolidation analyzer may be configured to determine projected values of various metrics including but not limited to volumetric utilization of each shipping container. Such metrics may also include a sum of the individual volumetric utilization values for each shipping container of the shipping configuration, an average of the individual volumetric utilization values for each shipping container of the shipping configuration, or some other composite measure of volumetric utilization for the particular shipping configuration. Any of such metrics may be based on the total volume and/or weight of the item group based on the item dimensions and weight and on the dimensions and/or weight of any non-item contents of the package (e.g., air bags or foam used as padding or filler, promotional inserts from the organization, etc). Such metrics may be used by the shipping consolidation analyzer to determine if the item group should be consolidated into one or more sets of items for shipping. In some embodiments, the shipping consolidation analyzer may also be configured to determine the particular items and quantities of each item that should make up each consolidated shipment set based, at least in part, on the volume and/or weight of the items and non-items, and on limitations of target containers appropriate for each shipment set (e.g., container dimensions, volume, and/or weight limit). A shipping consolidation analyzer is described in more detail below, according to various embodiments.

In some embodiments, the use of a shipping consolidation analyzer, with or without a separate box recommender, may allow more efficient coordination of packing and shipping (i.e., transportation) operations. In some embodiments, if the number and size of boxes to be used in shipping an item group is reliably predicted by the shipping consolidation analyzer, packing of shipment sets may be scheduled so that they are ready for shipment "just in time" for scheduled shipping operations appropriate for transporting each shipment set. For example, if the order fulfillment facility operates with a known schedule of shipments (e.g., a given transportation vendor picks up shipments eight times per day on a predetermined schedule), the packaging information system may use the results of the shipping consolidation analyzer to schedule picking, sorting, and packing of each shipment set so that it is available at the loading area at the appropriate time for shipment at a predetermined one of the scheduled pick-up times. In another example, if a given item group includes a shipment set that may be transported using a specialty transportation service (e.g., a cost-efficient media mailing service), that shipment set may be scheduled for picking, sorting, and packing so that it is available for pick-up by the specialty transportation service according to the pick-up schedule for the specialty transportation service.

In some embodiments, the packaging information system may make particular assumptions about item dimensions or may assign item dimensions according to a standard algorithm, or company policy, in order to facilitate the recommendation of containers for item groups and/or shipment consolidation analysis. For example, in one embodiment, the item dimension having the largest value may be designated to be the "height," the dimension having the second largest value may be designated to be the "length," and the dimension having the smallest value may be designated to be the "width" of the item. In such embodiments, the dimensions of containers may also be designated using the same assumptions. In other embodiments, different assumptions or assignments may be made, or the designation of length, height, and width dimensions of items or containers may be arbitrary. In some embodiments, standards or policies may specify other aspects of the packing and/or shipping operations of the facility, such as a default placement or orientation for certain items within containers or a specific packing algorithm to be assumed when recommending containers. For example, a policy may specify that the largest or heaviest item in an item group or shipment set should be placed horizontally along the bottom of shipping boxes.

A packaging information system, including a shipping consolidation analyzer, as described herein in various embodiments, may be utilized in a number of different facilities and situations, including, but not limited to materials handling facilities, order fulfillment centers, rental centers, distribution centers, packaging facilities, shipping facilities, libraries, museums, warehouse storage facilities, and the like. Note that the arrangement and order of operations illustrated by FIG. 1 is merely one example of many possible embodiments of the operation of an order fulfillment facility utilizing a packaging information system or stand-alone shipping consolidation analyzer. Other types of materials handling, manufacturing, or order fulfillment facilities suitable for application of a shipping consolidation analyzer may include different, fewer, or additional operations and resources, according to different embodiments.

In some embodiments, a materials handling facility may store different instances of items in different individual inventory areas within inventory 130. Additionally, different items may be stored together in a single inventory area, according to particular embodiments. In some cases, storing different items together may result in more efficient use of total inventory space than using a single inventory area for multiple copies of a single item or product. In other cases it may be beneficial to store similar items together to make better use of inventory space. In some embodiments, such as that illustrated in FIG. 2, an inventory area within inventory 130 may include both similar items stored together, such as on one shelf, and different items stored together, such as on another shelf. In this example, storing different compact discs (CDs) together on a single inventory shelf, as shown in inventory area 235b, may use the available inventory space more efficiently than storing one CD among other items of greatly differing size and shape, such electronic devices, clothing, or other items. In some embodiments, a materials handling facility may also store items of similar, but not identical, shape and size together in a single inventory area. For instance, in one embodiment, items such as books, CDs, and digital video discs (DVDs) may all be stored together, as shown in inventory area 235a. In still other embodiments, different items, with different shapes and sizes, may all be stored together. For example, inventory area 235e illustrates clothing and electronic items stored along with books, CDs, etc.

Figure 2:
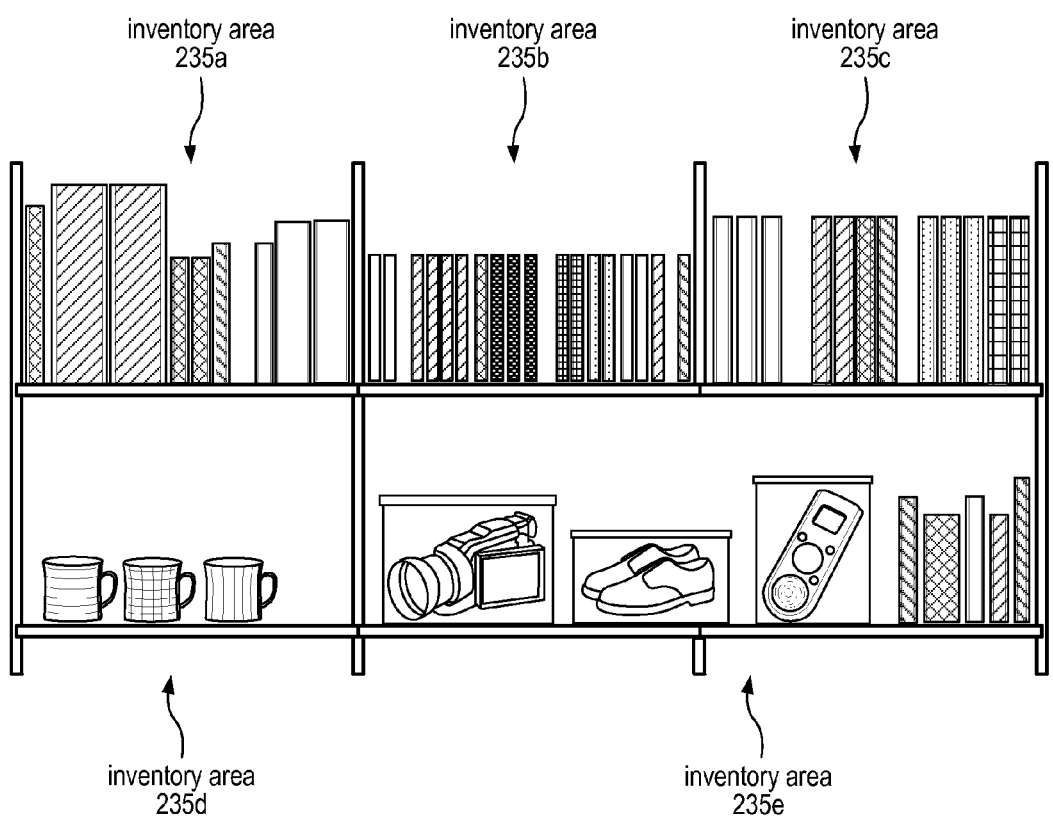
FIG. 2 illustrates an exemplary representation of inventory within a materials handling facility, according to some embodiments.

The items in a materials handling facility may be of varying shapes and sizes, as shown in the exemplary inventory areas illustrated in FIG. 2. In this example, some items in the materials handling facility are irregularly shaped. In some embodiments, irregularly shaped items may be stored in boxes or other regularly shaped packaging, which may facilitate container recommendation, shipment consolidation analysis, and/or more efficient storage, such as by making stacking of such items possible. This is illustrated in inventory area 235e. In other embodiments, irregularly shaped items may be stored, packed, and/or shipped without placing them in regularly shaped packaging. This is illustrated in inventory area 235d. According to various embodiments, shipment consolidation analysis, as described herein, may be utilized with any regularly shaped or irregularly shaped items.

Figure 3:
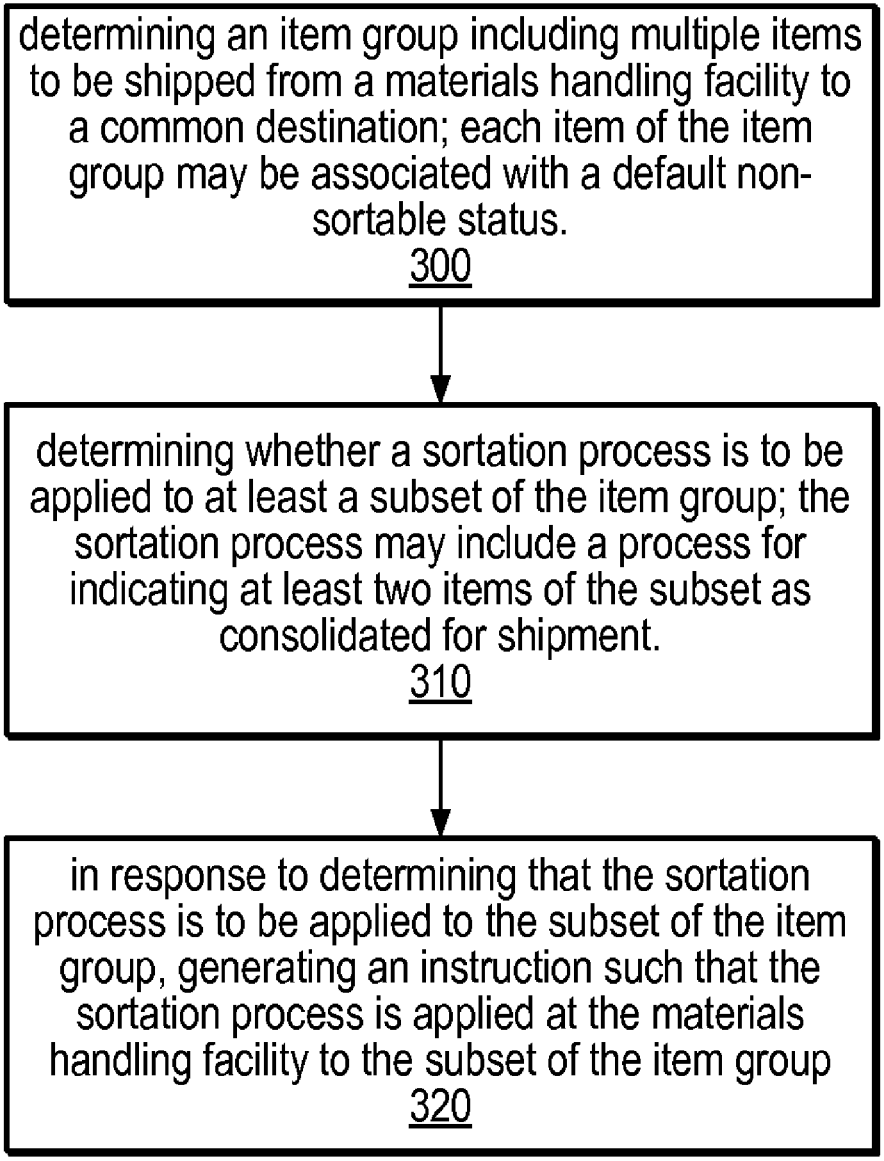
FIG. 3 illustrates an exemplary flowchart of a method for determining whether a sortation process is to be applied to items of an item group, according to some embodiments.

The system and method for selectively applying an item sortation process may include various methods, such as illustrated by the exemplary flowchart of FIG. 3. The illustrated method may be performed by a shipping consolidation analyzer or packaging information system as described herein. As illustrated by block 300, the method may include determining an item group including multiple items to be shipped from a facility (e.g., a materials handling facility) to a common destination (e.g., the same destination specified by a residential address, commercial address, or other destination specified by a customer). Each of the items of the item group may be associated with a default non-sortable status. In some embodiments, such default non-sortable status may indicate the item is to be (or is eligible to be) fulfilled according to a sortless fulfillment process, such as sortless fulfillment process 190 described above or another process in which items are not consolidated for shipment to a destination. In some embodiments, determining an item group may include determining that items of the item group are items of the same order. For instance, such order may be an order for multiple items placed by a customer on an e-commerce website. In other embodiments, determining an item group may include determining that items of the item group are items destined for the same destination (e.g., as determined by address) but not necessarily items of the same order. For example, the method may include determining that multiple orders for various items to be shipped to the same destination have been placed within a given time range (e.g., 1 minute, 1 day, or any other suitable time range). Accordingly, items of an item group may or may not be items of the same order.

As illustrated by block 310, the method may also include determining whether a sortation process is to be applied to at least a subset of (e.g., two or more) items from the item group. Such sortation process may include a process for indicating at least two items of the subset as consolidated for shipment. To determine whether a sortation process is to be applied, the method may include performing various analyses to determine whether items of the item group should be consolidated. In one such analysis, the method may include determining projections of different shipping configurations based on the items of the item group (and/or their associated characteristics, such as item dimensions, item weight, etc.) and available shipping containers (and/or their associated characteristics, such as dimensions, weight capacity, etc.). In various embodiments, the method may include determining multiple (in some cases all) possible shipping configurations given characteristics of items and available shipping containers. In some embodiments, the method may include receiving an indication of such possible shipping configurations from a container recommender (see e.g., the container recommender of FIG. 5).

Figure 4A:
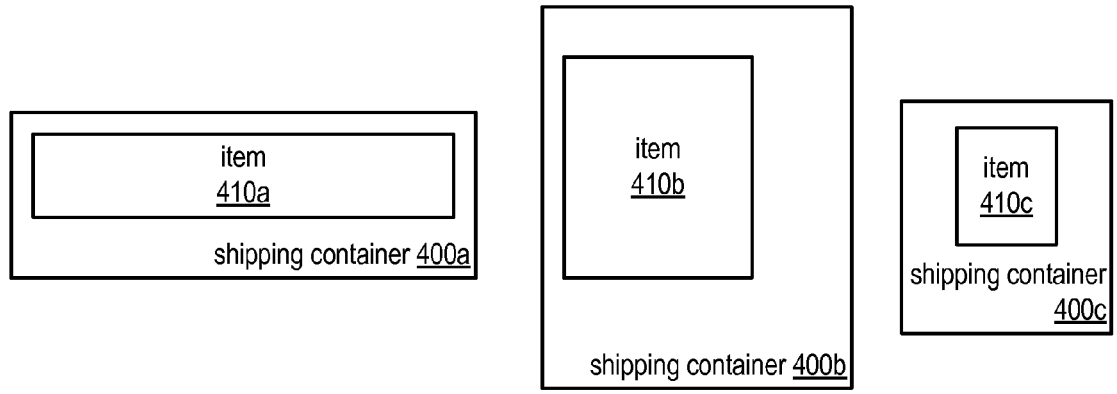
FIGS. 4A-4C illustrate example shipping configurations, according to some embodiments.
Figure 4B:
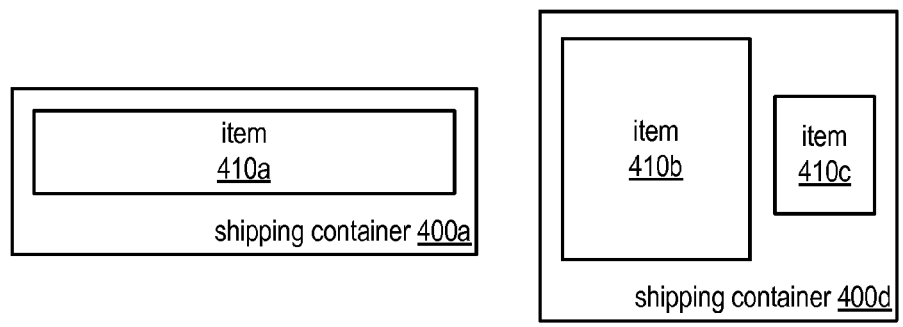
Figure 4C:
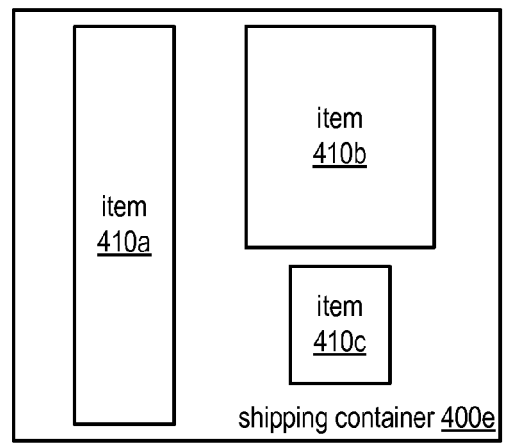

Collectively referring to FIGS. 3 and 4A-4C, each of FIGS. 4A-4C illustrate exemplary shipping configurations that may be projected in accordance with the method. Note that the illustrated items and shipping containers are not necessarily drawn to scale. For each shipping configuration of FIGS. 4A-4C, the method may include determining whether the configuration's projected shipping container utilization is larger than a requisite measure of shipping container utilization. In various embodiments, shipping container utilization may be based on a composite volumetric utilization based on the volumetric utilization of each individual shipping container of the shipping configuration. For example, for FIG. 4A, the method may include determining that the projected volumetric utilization for the shipping configuration is 60%. In some cases, volumetric utilization may be a measure of total item volume (e.g., a sum of the individual volumes) divided by total available volume of the shipping containers of the shipping configuration (e.g., a sum of the individual volumes of the shipping containers). In other cases, other techniques for determining shipping container utilization may be employed. It is the intention of various embodiments to include such techniques whether presently known or developed in the future. In various cases, the determination of shipping container utilization may or may not take the volume of packing materials (e.g., foam or air bags designed to absorb shock and protect packed items) or promotional items (fliers, coupons, etc.) into consideration. With respect to FIG. 4B, the method may include determining that the projected volumetric utilization for the shipping configuration is 75%. With respect to FIG. 4C, the method may include determining that the projected volumetric utilization for the shipping configuration is 65%. Note that such measures of shipping container utilization are merely exemplary and that many other combinations of shipping containers and items may be possible.

To determine whether a sortation process (e.g., such as sortful fulfillment process 195) is to be applied to items of the item group, the method may include determining whether one or more projected measures of shipping container utilization are larger than a requisite measure of shipping container utilization. In one example, the method may include utilizing an exemplary requisite measure of volumetric container utilization (i.e., a threshold of shipping container utilization) of 70% (any other requisite measure of shipping container utilization may be utilized in various embodiments). With respect to the shipping configuration of FIGS. 4A-4C and the exemplary measure of shipping container utilization described above, the method may determine that only the shipping configuration of FIG. 4B meets the requisite measure of shipping container utilization (since 75% utilization is larger than the threshold of 70% utilization). Accordingly, in some embodiments, the method may determine that the sortation process (e.g., such as sortful fulfillment process 195) is to be applied to items 410b and 410c of FIG. 4B. In various other embodiments, item weight or item dimensions other than volume may be utilized (in addition to or as an alternative to volumetric utilization) to determine shipping container utilization.

In some embodiments, a measure of customer convenience may be utilized to determine whether a sortation process is to be applied to items of the item group. In one embodiment, the measure of customer convenience may reflect the ease of unpacking a particular shipping configuration, such as the shipping configuration of FIGS. 4A-4C. For instance, a shipping configuration with a very large number of packages may be considered to have a very low measure of customer convenience whereas a shipping configuration with only one or few packages may be considered to have a very high measure of customer convenience. In other cases, the measure of customer convenience may be based on the ease of opening one or more shipping containers. For instance, item packaging including customer friendly opening mechanisms (e.g., such as perforated tear away strips) may be considered to have a higher measure of customer convenience than item packaging that requires tools (e.g., scissors or pliers) to open. In one embodiment, one or more items of the item group may be indicated as having item packaging (e.g., packaging in which the item is packed at the item manufacturer) that is sufficient for shipping. In these cases, packing such an item in a shipping container may decrease the measure of customer convenience. In one embodiment, the method may indicate each of such items for shipment within the items product packaging without being packed in another shipping container.

In various embodiments, the method may utilize additional (or alternative) constraints to determine whether a sortation process is to be applied to items of an item group. In one embodiment, such additional constraints may include a real-time or projected measure of available resources of the facility at which the item group is being fulfilled. The method may include determining whether a projected or real-time measure of the facility's resources is greater than a requisite measure of available resources (e.g., such as a measure defined by the shipping consolidation analyzer or a system administrator). Such measure of the facility's available resources may include but is not limited to a projected or real-time measure of available labor (e.g., man or machine power) of said facility, a projected or real-time measure of availability of one or more conveyance devices (e.g., carts, conveyor belts, chutes, etc.) for conveying items from one location in the facility to another location in the facility, a projected or real-time measure of availability of one or more storage areas for storing items within the facility, a projected or real-time measure of availability of one or more storage containers for storing items within said facility, and a projected or real-time measure of any other hardware or physical resource of the materials handling facility (e.g., automated or semi-automated sortation systems, loading docks, forklifts, crates, pallets, and/or any other physical object or material).

In embodiments where a threshold or requisite measure of shipping container utilization is employed, such requisite measure of shipping container utilization may be modified or varied to control the quantity of items to which it is determined that a sortation process is to be applied. For instance, as described above, the materials handling facility may include a variety of resources for performing a sortation process in the materials handling facility. Such resources may include but are not limited to availability of labor, conveyance devices, storage areas, and storage containers. Accordingly, the method may in various embodiments include modifying the requisite measure of shipping container utilization in response to one or more measures (and/or changes in measures) of availability of said resources. In one example, when the availability of a given facility resource becomes scarce, the method may include increasing the requisite measure of shipping container utilization such that the quantity of items to which it is determined that a sortation process is to be applied decreases.

As indicated by block 320, the method may include, in response to determining that the sortation process is to be applied to the subset of the item group, generating an instruction such that the sortation process is to be applied to the subset of the group of items. In one embodiment, such instruction may include an instruction that instructs one or more agents to deliver the subset of the item group to one or more areas or stations associated with a sortful fulfillment process, such as sortful fulfillment process 195. For instance, such instruction may include instructing an agent to provide a group of items to sorting operations 195. In other embodiments, one or more systems may manage the flow of items within the materials handling facility, and generating such instruction may include generating an instruction for such system(s) to route items of the subset to one or more sortation areas or stations within the facility. In other embodiments, the method may include determining that the sortation process is not to be applied to items of the item group and, in response, generating an instruction such that a sortless fulfillment process, such as sortless fulfillment process 190, is applied to such items.

In one embodiment, one or more computer systems of the facility may subscribe to a notification feed from an upstream process configured to provide notifications of item consolidation. In various embodiments, notifications from upstream processes may indicate, for a given item group, the item(s) that are to be fulfilled according to a sortless fulfillment process (e.g., sortless fulfillment process 190) and/or the item(s) that are to be fulfilled according to a sortful fulfillment process (e.g., sortful fulfillment process 195). In other embodiments, the instruction that the sortation process is to be applied to the subset is generated locally at the materials handling facility, not by an upstream process.

Figure 5:
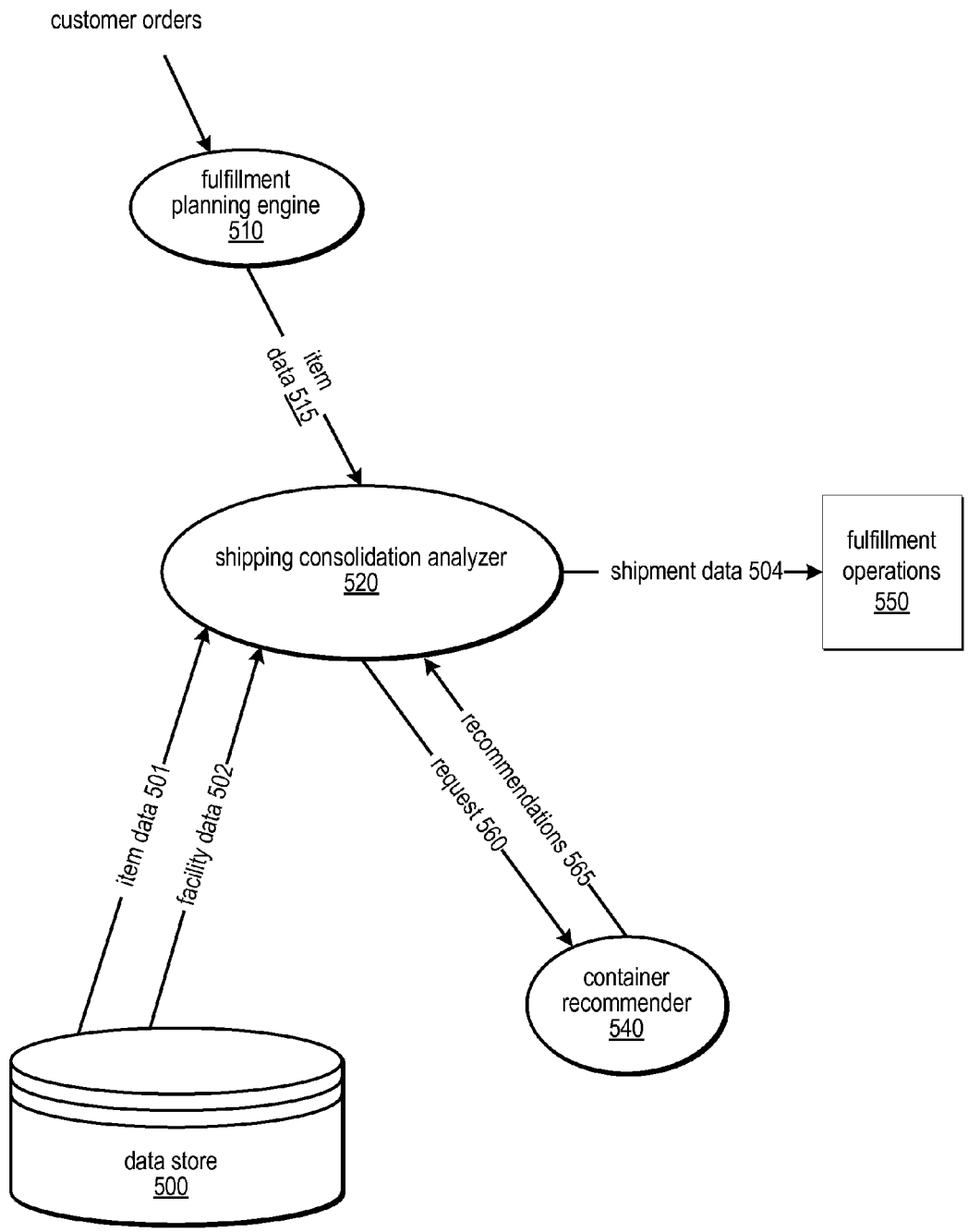
FIG. 5 illustrates a data flow diagram of a packaging information system including a shipping consolidation analyzer, according to some embodiments.

As discussed above, in some embodiments a shipping consolidation analyzer may be a component of an overall packaging information system for a materials handling facility. FIG. 5 illustrates a data flow diagram for a packaging information system that includes a shipping consolidation analyzer, according to one embodiment. The packaging information system may include various hardware and/or software components configured to carry out the operations described herein as part of shipment consolidation analysis or shipping container recommendation. In this example, data store 500 may be a data store containing item parameter values (e.g., item dimension and weight values) for all of the items handled within a materials handling facility and may also contain container parameter values (e.g., container dimensions, weight, and/or capacity information for each type of container used within the facility). Data store 500 may be a data store located within the materials handling facility itself and accessed by the various operations of the facility or may be a remote data store accessed by various operation of the facility via a network over which they are connected.

As illustrated in FIG. 5, a packaging information system may in some embodiments include an upstream fulfillment planning engine 510, configured to determine the facility or facilities to which an item group or complete customer order should be directed. As described above, a fulfillment planning engine 510 may in some embodiments be configured to determine whether or not a single fulfillment facility is able to provide all of the items in an order, and may pass subsets of a customer order to the smallest number of fulfillment facilities that may supply the required items. In other embodiments, fulfillment planning engine 510 may be configured to divide a customer order into multiple item groups dependent on other parameters, including, but not limited to, a service level agreement, the location of one or more facilities with respect to a destination, customer and/or order priorities (e.g., premium customer service or premium shipping considerations), specialty transportation service availability, or specialty services capability (e.g., gift wrapping or export services).

Fulfillment planning engine 510 may provide item data 515 for one or more items of one or more customer orders to be fulfilled, to one or more shipping consolidation analyzers 520 (e.g., to a shipping consolidation analyzer 520 in each of two or more target facility or to one or more centrally located shipping consolidation analyzers 520 on behalf of one or more target facilities). For instance, fulfillment planning engine 510 may be integrated with an e-commerce portal configured to receive customer orders for one or more items; the fulfillment planning engine may provide indications of such items to one or more shipping consolidation analyzers for fulfillment. In some embodiments, shipping consolidation analyzer 520 may provide feedback to fulfillment planning engine 510 (e.g., feedback indicating the results of shipment consolidation analysis, the configuration of a target facility, the capabilities and available services of a target facility, the available containers of a target facility, etc.). In the example illustrated in FIG. 5, fulfillment planning engine 510 may also provide item group data 515 to data store 500 for storage and/or future analysis (not shown).

In the example illustrated in FIG. 5, shipping consolidation analyzer 520 may obtain item data 501 and facility data 502 from data store 500. Item data 501 may include dimension information, weight information, affinity and/or relationship information, or category information associated with each item in an item group, in various embodiments. Facility data 502 may include facility configuration, capability, or constraint information; available container information; dimension, weight or capacity information for available containers; and/or information about any available resource at the target facility. As described above, any or all of item data 501 and/or facility data 502 may be used by the shipping consolidation analyzer 520 to determine if and how packages of a given item group should be consolidated into the same shipping container for shipment to a destination. In some embodiments, shipping consolidation analyzer 520 may provide feedback to data store 500 for storage and/or future analysis. For example, in some embodiments, information indicating if and/or how an item group was consolidated (e.g., by what parameter(s) it was consolidated). This information may in some embodiments be analyzed by the shipment consolidation analyzer or packaging information system later to produce reports and/or to determine trends in the operation of the materials handling facility and/or the shipment consolidation analysis, as described herein.

In the example illustrated in FIG. 5, shipping consolidation analyzer 520 may output shipment data 504, which may include a list of item identifiers for items included in each shipment set (and quantities associated with each item identifier). Shipment data 504 may also include an indication or instruction indicating the manner in which each shipment set is to be fulfilled. In some embodiments, the shipment set may include a single item and shipment data 504 may indicate that the item is to be fulfilled according to a non-sortable process, such as sortless fulfillment process 190 described above. In other cases, the shipment set may include multiple items and shipment data 504 may indicate that the items are to be fulfilled according to a sortable process, such as sortful fulfillment process 195 described above. Shipment data 504 may in various embodiments be provided to data store 500 (e.g., for storage and/or future analysis), a container recommended 540, and/or directly to fulfillment operations 550 in the target facility for a given item group. Such fulfillment operations may include sortless fulfillment process 190 or sortful fulfillment process 195 dependent upon the determination of the shipping consolidation analyzer. In some embodiments, a stand-alone container recommender 540 may be invoked or called (see e.g., request 560) by the shipping consolidation analyzer in order to determine the recommend shipping containers or shipping configurations (as illustrated by recommendations 565) for shipping an item group to a destination (as described above with respect to FIG. 4). In other embodiments, the functionality of a container recommender (e.g., a software module similar to a stand-alone container recommender 540) may be included as part of shipping consolidation analyzer 520 in order to determine recommended shipping containers or shipping configurations (see e.g., FIG. 4) directly.

Note that shipment data 504 may be provided to packing/shipping operations 550 on an input/output device readable by an agent working in the materials handling facility, in some embodiments. In other embodiments, shipment data 504 may be printed for an agent, such as on a pick list or packing list. In still other embodiments, a machine may be configured to pick and/or present a recommended container (such as a box) to an agent or to an automated packing system and/or to automatically transport the items in a given shipment set to a portal, path, or packing station (e.g., one suitable for handling containers having a particular range of dimensions and/or weight capacity) for packing. Note also that packing/shipping operations 550 may provide feedback 555 to shipment consolidation analyzer 520 (e.g., feedback an actual container used for each shipment set, the configuration of a target facility, the capabilities and available services of a target facility, the available containers of a target facility, etc.). Feedback from packing/shipping operations 550 may be received from an agent (e.g., as data entered by an agent on a terminal or other communication device), in some embodiments, or from an automated feedback mechanism of various operations of the materials handling facility.

In some embodiments, a shipment consolidation analyzer may in some embodiments be configured to provide report data in response to one or more requests from, e.g., a report console or other component for monitoring the performance of the shipping consolidation analyzer. In one example, such a report console may include a web browser through which a user may request various reports and on which these reports may be displayed. For example, a user may request one or more reports regarding the number or percentage of item groups consolidated, the number or average number of items in each shipment set, the number or percentage of item groups requiring exception handling for shipment consolidation, the number or percentage of item groups shipped as whole or partial palettes, or the performance of the overall packaging operation in terms of speed, rework, or meeting transportation schedules. In some embodiments, trends of each of these metrics may be reported and/or analyzed in order to identify opportunities to improve the shipment consolidation method and/or the configuration of a given materials handling facility. For example, if one of these metrics changes by a given percentage (up or down), the shipment consolidation analyzer may be configured to flag the change and/or to trigger a review of the performance of the packaging information system or the operation of a given facility.

While the embodiment illustrated by FIG. 5 includes a fulfillment planning engine 510, a shipment consolidation analyzer 520, and a container recommender 540 that are separate components of a system configured to manage packing/shipping operations in a materials handling facility on behalf of an order fulfillment operation, in other embodiments, the functionality described as being performed by each of these components may all be performed by sub-components of a single system component, or may be partitioned in other ways. For example, in one embodiment, container recommender 540 may be implemented as a module of a software application configured to implement shipment consolidation analyzer 520. In another example, data store 500 may be located in a memory of the same computing node or of a different computing node than a memory that includes program instructions configured to implement a packaging information system, fulfillment planning engine 510, shipment consolidation analyzer 520 and/or container recommended 540.

In some embodiments, the packaging information system may also include a remote data store, such as a data store located at a headquarters of a company operating the materials handling facility. In some embodiments, metrics may be provided by data store 500 to such a remote data store concerning the operations of the materials handling facility. These metrics may include shipment data 504, container usage data, and other data collected and/or collated by the packaging information system. Metrics that may be extracted from data store 500 may be analyzed and compared to similar metrics received by a remote data store from other materials handling facilities, in some embodiments. For example, these metrics may be used to identify best practices at one or more materials handling facilities. In another embodiment, information may be provided to a remote data store by data store 500 and may be distributed to other materials handling facilities configured to exchange information with the remote data store. In various embodiments, shipment data 504 may include instructions generated by the shipping consolidation analyzer, such as the instruction generated in accordance with the description of item 320 described above.

In some embodiments, a shipment consolidation analyzer may be a component of a comprehensive packaging information service. Such a service may include additional components configured to provide other functionality to various operations in the materials handling facility. For example, the service may include any or all of the following:

- a box forecasting service, configured to generate a report specifying what containers (e.g., boxes) to erect, and when to erect them, so that they are delivered to shipment assembly at the same time as the items.
- a package type recommender, configured to recommend a packaging type based on shipment weight or product types to reduce damage in shipping. For example, stronger corrugate may be recommended for heavier product or a fragile item may be directed to a box rather than a folder.
- a shipping method recommender, configured to assign shipment methods dependent on box type availability and the resulting cost of shipment.
- a filler recommender, configured to recommend a number of air bags for a container, for example.
- an inbound prepping service, configured to use a container recommendation for prepping of inbound items.
- a packaging system flow analyzer, configured to display a tradeoff in packaging choice versus productivity in real time. For example, if a package choice is optimum, but a corresponding productivity impact negates savings, the analyzer may recommend a choice to be made.
- an automated inventory cycle counter, configured to decrement consumables used in packing/shipping operations. This may reduce manual cycle count errors, and account for wastage.
- a financial analyzer, configured to offer comparison data for supplies cost from container usage reports to manual cycle count usage data.

a new merchant shipping cost forecaster, configured to determine a real shipping cost impact of new merchant integration to replace fixed estimates.

a customer container advisor, configured to determine the number of boxes a customer should expect for an order and to display this at checkout.

a package performance analyzer configured to determine the cost of shipping item groups according to various shipping configurations.

a process path recommender, configured to direct particular item groups to process paths in which recommended containers are available.

A shipping consolidation analyzer may be further described using the following example. In this example, an e-commerce organization sells items of various types that can be shipped to customers, and a customer may place an order for an arbitrary quantity of each of any number of different items. A customer order may be provided to a materials handling facility intact (e.g., containing all of the items in a given customer order) or may be divided into two or more item groups by a fulfillment planning engine, as described herein. FIGS. 6A-6C illustrate various groupings of items in one such item group, according to one embodiment.

In this example, FIG. 6A illustrates an item group grouping provided to a materials handling facility and comprising fifteen different items. In this example, each of the different items is associated with a respective item identifier 620 (e.g., 620a, 620b . . . 620o) and each item identifier is associated with a respective quantity 630 (e.g., 630a, 630b . . . 630o). In this example, the item group described by the list in FIG. 6A is also associated with an order identifier 600. In various embodiments, this order identifier 600 may represent the original (i.e., complete) customer order and/or an identifier of one item group making up the original customer order. For example, in some embodiments, the order identifier 600 may include two fields: a customer order identifier and an item group (i.e., partial order) identifier. If the item group does not include all of the items of a customer order, other such item group groupings may be provided to other materials handling facilities at the same time or at another time (e.g., if some items are back-ordered).

In the example illustrated in FIGS. 6A-6C, it is assumed that a sortation process is to be applied to at least some of the items shown in FIG. 6A according to the methods illustrated in FIG. 3. In this example, the items illustrated in FIG. 6A may be sorted according to one or more item parameters, such as dimensions, weights, or other characteristics. In other cases, sorting the items may help prepare the data for shipment consolidation but in some cases is not necessary. Note that each item of FIG. 6A may be associated with a default non-sortable status as described above with respect to FIG. 3.

In this example, the items shown in FIG. 6A make up an initial list from which items will be selected or not selected (in accordance with the method of FIG. 3) for inclusion in one or more consolidated shipment sets as determined by a shipment consolidation analyzer. In the example illustrated in FIGS. 6A-6C, FIG. 6B illustrates an item grouping for the first shipment set to which it is determined (in accordance with the description of FIG. 3) that a sorting process is to be applied, as demonstrated by indication 615. Additionally, in this example, the item grouping shown in FIG. 6C represents the items for which it is determined a sorting process is not to be applied, as illustrated by indication 625. Alternatively, indication 625 may indicate that a sortless fulfillment process (in accordance with the description of FIG. 3), such as sortless fulfillment process 190, is to be applied to the listed items.

Note that FIGS. 6B-6C may represent one example of shipment data 504 described above with respect to FIG. 5.

The methods used by a packaging information system are not intended to be limited to those described above, and illustrated and described with respect to FIG. 3, and may include any other algorithms suitable for determining if and/or how an item group should be consolidated into one or more shipment sets in a materials handling facility, according to different embodiments. For example, a shipment consolidation analyzer may use different parameter values and/or parameter thresholds to determine whether or not an items of an item group should be consolidated for shipment, or may use a combination of measured, stored, and estimated data (e.g., data estimated through observation or by an automated product dimension/weight correction function) to determine if and/or how a given item group should be consolidated into one or more shipment sets.

A packaging information system, or stand-alone shipment consolidation analyzer, may be implemented within the facility in one or more software modules executing on one or more nodes of a computing system (e.g., as program instructions and data structures configured to implement functionality described), or in any combination of hardware and software components suitable for implementing the functionality described. It may be configured to receive inputs from other software applications, agents working in the facility or remotely, and/or automated systems within the facility (e.g., scanners, sensors, automated storing, picking, or packing equipment, or software applications managing one or more local or remote data stores.) For example, when an item group is placed in a container for shipping, a container identifier (e.g., a bar code) and an item group identifier may automatically be scanned, or these identifiers may be input by a packing agent using a terminal or other suitable input device. In addition, an identifier of the packing station and/or agent responsible for packing the item group for shipping may be automatically captured or manually input. Any or all of this information, along with other information received from and/or stored by other operations in the materials handling facility may serve as inputs to the packaging information system.

Figure 7:
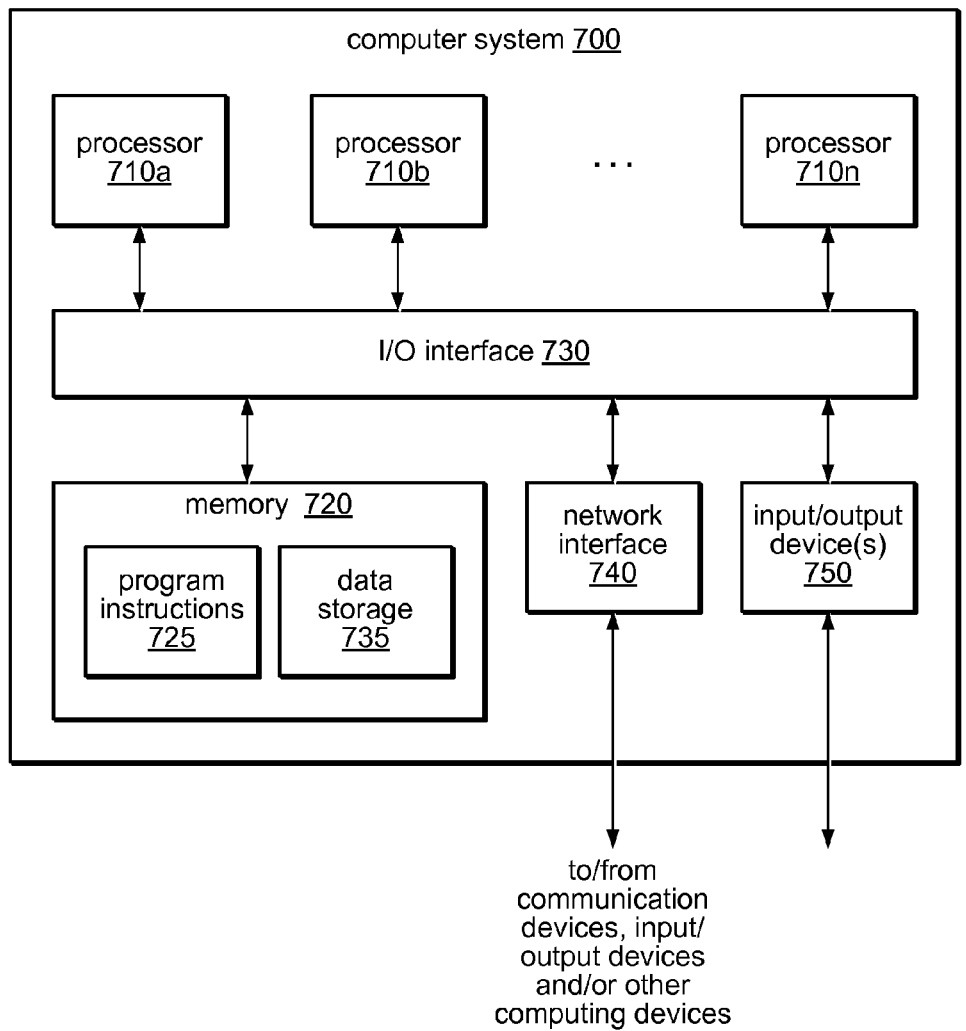
FIG. 7 illustrates an exemplary system for implementing a shipping consolidation analyzer, according to some embodiments.

Shipment consolidation analysis and/or a packaging information system, as described herein, may be executed on one or more computer systems, interacting with various other devices in a materials handling facility, according to various embodiments. One such computer system is illustrated by FIG. 7. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750. In some embodiments, it is contemplated that automated shipment consolidation analysis and/or other components of a packaging information system may be implemented using a single instance of computer system 700, while in other embodiments multiple such systems, or multiple nodes making up computer system 700, may be configured to host different portions or instances of automated shipment consolidation analysis and/or a packaging information system. For example, in one embodiment some data sources or services (e.g., capturing container information for a shipment set) may be implemented via one or more nodes of computer system 700 that are distinct from those nodes implementing other data sources or services (e.g., recommending a container for an item group). In some embodiments, a given node may implement the functionality of more than one component of automated shipment consolidation analysis and/or a packaging information system.

In various embodiments computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, configured to implement automated shipment consolidation analysis and/or a packaging information system, and data storage 735, comprising various tables, databases and/or other data structures accessible by program instructions 725. In one embodiment, program instructions 725 may include various software modules configured to implement a shipment consolidation analyzer, such as that described in conjunction with FIGS. 3-4 and/or a packaging information system, as described in conjunction with FIG. 5, which may include a box recommender (such as container recommender 540 described above). It may also include program instructions suitable for interacting with data store 500 (e.g., to store and/or retrieve data from the data store). In various embodiments, program instructions 725 may include software modules configured to implement any of the functionality described herein for comprehensive packaging information system.

As noted above, data storage 735 may include one or more tables, databases, or other data structures used for storing and retrieving various parameter values used in conjunction with the system and methods described herein. For example, data storage 735 may include various data stores for maintaining item parameter values, container parameter values, item group information (such as that illustrated in FIGS. 6A-6C), facility configuration information, customer preference information, order information, and various reports produced by the shipment consolidation analyzer and/or other components of a packaging information system. Item parameter values may include an identifier, a weight, a volume, a length, a height, a width, a suspect dimensions count, or a confidence level value, as well as item names, quantities, descriptions, pricing, cost, or any other information that may be included in a product catalog, inventory management system, or other representation of the items in the materials handling facility, in various embodiments. Container parameters may include container identifiers, names, and dimensions, as well as weight, weight capacity, color, composition, quantity, supplier name, or any other information about containers that may be useful to the various operations of the materials handling facility. In various embodiments, item group information may also include information about containers used in shipping each item group and/or shipment set therefore, and may also include recommended containers for each item group and/or shipment set. In various embodiments, any or all of the data and/or tables described herein may be included as data storage 735.

In various embodiments, the parameter values and other data illustrated herein as being included in one or more data stores may be combined with other information not described or may be partitioned differently into more, fewer, or different data structures. In some embodiments, data stores used in automated shipment consolidation analysis and/or in a packaging information system, or portions thereof, may be physically located in one memory or may be distributed among two or more memories. These memories may be part of a single computer system or they may be distributed among two or more computer systems, such as two computer systems connected by a wired or wireless local area network, or through the Internet, in different embodiments. Similarly, in other embodiments, different software modules and data stores may make up an automated shipment consolidation analyzer and/or a packaging information system.

Users may interact with the shipment consolidation analyzer and/or packaging information system in various ways in different embodiments, such as to automatically measure and/or manually specify measured dimension values for items and/or packaging, to specify thresholds (e.g., a requisite measure of shipping container utilization) to be used when determining whether to consolidate a shipment (as described in regard to FIG. 3), or to specify reports to be generated and/or report parameters. For example, some users may have physical access to computing system 700, and if so may interact with various input/output devices 750 to provide and/or receive information. Alternatively, other users may use client computing systems to access the computer system remotely via network interface 740 (e.g., via the Internet and/or the World Wide Web). In addition, some, or all, of the shipment consolidation analyzer and/or packaging information system components may provide various feedback or other general types of information to users (e.g., in response to user requests) via one or more input/output devices 750.

Those skilled in the art will appreciate that computing system 700 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing system 700 may also be connected to other devices that are not illustrated, or instead may operate as a stand-alone system. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, different embodiments may be practiced with other computer system configurations.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as illustrated in the figures and described herein represent exemplary embodiments of methods. The methods may be implemented in software, in hardware, or in a combination thereof in other embodiments. Similarly, the order of any method may be changed, and various elements may be added, reordered, combined, omitted, modified, etc., in other embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer accessible storage medium, other aspects may likewise be so embodied.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
using one or more computers to perform:
determining an item group comprising a plurality of items to be shipped from a single materials handling facility to a same destination, the item group picked from inventory of the materials handling facility, the materials handling facility configured to perform a sortless process that includes preparing distinct shipments that each include a distinct shipping container containing a distinct item of the item group such that each distinct shipping container contains no more than one item from inventory of the materials handling facility, wherein each item of said item group has a default non-sortable status that indicates that item by default is to be processed by the sortless process of the materials handling facility;
determining whether a sortation process is to be applied to at least a subset of the item group based on an evaluation of multiple projected measures of shipping container utilization for different combinations of shipping containers, each combination configured to collectively hold all items of the item group, wherein said sortation process comprises a process for sorting at least two items of said subset together for consolidated shipment from the materials handling facility in a same shipping container;

in response to said evaluation resulting in a determination that a projected measure of shipping container utilization for one of said combinations that utilizes shipment consolidation according to said sortation process is greater than a requisite threshold of shipping container utilization, generating one or more instructions for handling said plurality of items such that said sortation process is applied at said materials handling facility to said at least a subset of the item group.

2. The computer-implemented method of claim 1, wherein said requisite threshold of shipping container utilization is configurable.

3. The computer-implemented method of claim 1, wherein each projected measure of shipping container utilization comprises a projected measure of volumetric utilization of one or more shipping containers projected to contain one or more items of the item group.

4. The computer-implemented method of claim 1, wherein each projected measure of shipping container utilization comprises a projected measure of weight utilization of one or more shipping containers projected to contain one or more items of the item group.

5. The computer-implemented method of claim 1, wherein each projected measure of shipping container utilization comprises a projected measure of a total number of boxes to be utilized to ship the items of the item group to said destination.

6. The computer-implemented method of claim 1, wherein determining whether a sortation process is to be applied to said at least a subset of the item group is dependent upon a projected measure of said materials handling facility's available resources.

7. The computer implemented method of claim 6, wherein determining whether a sortation process is to be applied to said at least a subset of the item group comprises determining whether the projected measure of said materials handling facility's available resources is greater than a requisite measure of available resources.

8. The computer-implemented method of claim 6, wherein said projected measure of said materials handling facility's available resources comprises a projected measure of available labor of said materials handling facility.

9. The computer-implemented method of claim 6, wherein said projected measure of said materials handling facility's available resources comprises a projected measure of availability of one or more physical resources of said materials handling facility.

10. The computer-implemented method of claim 6, wherein said projected measure of said materials handling facility's available resources comprises a projected measure of availability of one or more conveyance devices for conveying items from one location in said materials handling facility to another location in said materials handling facility.

11. The computer-implemented method of claim 6, wherein said projected measure of said materials handling facility's available resources comprises a projected measure of availability of one or more storage areas for storing items within said materials handling facility.

12. The computer-implemented method of claim 6, wherein said projected measure of said materials handling facility's available resources comprises a projected measure of availability of one or more storage containers for storing items within said materials handling facility.

13. The computer-implemented method of claim 1, further comprising:

determining that at least one particular item of said item group is pre-packaged within product packaging suitable for shipment; and storing an indication that the item is to be shipped within said product packaging without being packed within an additional shipping container.

14. The computer-implemented method of claim 1, wherein all of the items of said item group are items of the order.

15. The computer-implemented method of claim 1, wherein at least two of the items of said item group are items of disparate orders.

16. A system, comprising:

a memory comprising program instructions;

one or more processors coupled to said memory; wherein said program instructions are executable by the processor to implement a shipping consolidation analyzer configured to:

determine an item group comprising a plurality of items to be shipped from a single materials handling facility to a same destination, the item group picked from inventory of the materials handling facility, the materials handling facility configured to perform a sortless process that includes preparing distinct shipments that each include a distinct shipping container containing a distinct item of the item group such that each distinct shipping container contains no more than one item from inventory of the materials handling facility, wherein each item of said item group has a default non-sortable status that indicates that item by default is to be processed by the sortless process of the materials handling facility;

determine whether a sortation process is to be applied to at least a subset of the item group based on an evaluation of multiple projected measures of shipping container utilization for different combinations of shipping containers, each combination configured to collectively hold all items of the item group, wherein said sortation process comprises a process for sorting at least two items of said subset together for consolidated shipment from the materials handling facility in a same shipping container;

in response to said evaluation resulting in a determination that a projected measure of shipping container utilization for one of said combinations that utilizes shipment consolidation according to said sortation process is greater than a requisite threshold of shipping container utilization, generate one or more instructions for handling said plurality of items such that said sortation process is applied at said materials handling facility to said at least a subset of the item group.

17. The system of claim 16, wherein said requisite threshold of shipping container utilization is configurable.

18. The system of claim 16, wherein each projected measure of shipping container utilization comprises a projected measure of volumetric utilization of one or more shipping containers projected to contain one or more items of the item group.

19. The system of claim 16, wherein each projected measure of shipping container utilization comprises a projected measure of weight utilization of one or more shipping containers projected to contain one or more items of the item group.

20. The system of claim 16, wherein each projected measure of shipping container utilization comprises a projected measure of a total number of boxes to be utilized to ship the items of the item group to said destination.

21. The system of claim 16, wherein the shipping consolidation analyzer is configured to determine whether a sortation process is to be applied to said at least a subset of the item group, dependent upon a projected measure of said materials handling facility's available resources.

22. The system of claim 21, wherein to determine whether a sortation process is to be applied to said at least a subset of the item group the shipping consolidation analyzer is configured to determine whether the projected measure of said materials handling facility's available resources is greater than a requisite measure of available resources.

23. The system of claim 21, wherein said projected measure of said materials handling facility's available resources comprises a projected measure of available labor of said materials handling facility.

24. The system of claim 21, wherein said projected measure of said materials handling facility's available resources comprises a projected measure of availability of one or more physical resources of said materials handling facility.

25. The system of claim 21, wherein said projected measure of said materials handling facility's available resources comprises a projected measure of availability of one or more conveyance devices for conveying items from one location in said materials handling facility to another location in said materials handling facility.

26. The system of claim 21, wherein said projected measure of said materials handling facility's available resources comprises a projected measure of availability of one or more storage areas for storing items within said materials handling facility.

27. The system of claim 21, wherein said projected measure of said materials handling facility's available resources comprises a projected measure of availability of one or more storage containers for storing items within said materials handling facility.

28. The system of claim 16, wherein the shipping consolidation analyzer is configured to:
   determine that at least one particular item of said item group is pre-packaged within product packaging suitable for shipment; and
   store an indication that the item is to be shipped within said product packaging without being packed within an additional shipping container.

29. The system of claim 16, wherein all of the items of said item group are items of the order.

30. The system of claim 16, wherein at least two of the items of said item group are items of disparate orders.

31. A non-transitory computer-readable storage medium, comprising program instructions computer-executable to implement a shipment consolidation analyzer configured to:
   determine an item group comprising a plurality of items to be shipped from a single materials handling facility to a same destination, the item group picked from inventory of the materials handling facility, the materials handling facility configured to perform a sortless process that includes preparing distinct shipments that each include a distinct shipping container containing a distinct item of the item group such that each distinct shipping container contains no more than one item from inventory of the materials handling facility, wherein each item of said item group has a default non-sortable status that indicates that item by default is to be processed by the sortless process of the materials handling facility;
   determine whether a sortation process is to be applied to at least a subset of the item group based on an evaluation of multiple projected measures of shipping container utilization for different combinations of shipping containers, each combination configured to collectively hold all items of the item group, wherein said sortation process comprises a process for sorting at least two items of said subset together for consolidated shipment from the materials handling facility in a same shipping container;
   in response to said evaluation resulting in a determination that a projected measure of shipping container utilization for one of said combinations that utilizes shipment consolidation according to said sortation process is greater than a requisite threshold of shipping container utilization, generate one or more instructions for handling said plurality of items such that said sortation process is applied at said materials handling facility to said at least a subset of the item group.

32. The medium of claim 31, wherein said requisite threshold of shipping container utilization is configurable.

33. The medium of claim 31, wherein each projected measure of shipping container utilization comprises a projected measure of volumetric utilization of one or more shipping containers projected to contain one or more items of the item group.

34. The medium of claim 31, wherein each projected measure of shipping container utilization comprises a projected measure of weight utilization of one or more shipping containers projected to contain one or more items of the item group.

35. The medium of claim 31, wherein each projected measure of shipping container utilization comprises a projected measure of a total number of boxes to be utilized to ship the items of the item group to said destination.

36. The medium of claim 31, wherein the shipping consolidation analyzer is configured to determine whether a sortation process is to be applied to said at least a subset of the item group, dependent upon a projected measure of said materials handling facility's available resources.

37. The medium of claim 36, wherein to determine whether a sortation process is to be applied to said at least a subset of the item group the shipping consolidation analyzer is configured to determine whether the projected measure of said materials handling facility's available resources is greater than a requisite measure of available resources.

38. The medium of claim 36, wherein said projected measure of said materials handling facility's available resources comprises a projected measure of available labor of said materials handling facility.

39. The medium of claim 36, wherein said projected measure of said materials handling facility's available resources comprises a projected measure of availability of one or more physical resources of said materials handling facility.

40. The medium of claim 36, wherein said projected measure of said materials handling facility's available resources comprises a projected measure of availability of one or more conveyance devices for conveying items from one location in said materials handling facility to another location in said materials handling facility.

41. The medium of claim 36, wherein said projected measure of said materials handling facility's available resources comprises a projected measure of availability of one or more storage areas for storing items within said materials handling facility.

42. The medium of claim 36, wherein said projected measure of said materials handling facility's available resources comprises a projected measure of availability of one or more storage containers for storing items within said materials handling facility.

43. The medium of claim 31, wherein the shipping consolidation analyzer is configured to:

determine that at least one particular item of said item group is pre-packaged within product packaging suitable for shipment; and store an indication that the item is to be shipped within said product packaging without being packed within an additional shipping container.

44. The medium of claim 31, wherein all of the items of said item group are items of the order.

45. The medium of claim 31, wherein at least two of the items of said item group are items of disparate orders.

* * * * *